June 7, 1949.  T. BROWN  2,472,742
ADJUSTABLE AXLE AND WHEEL ASSEMBLY
Filed Feb. 27, 1948
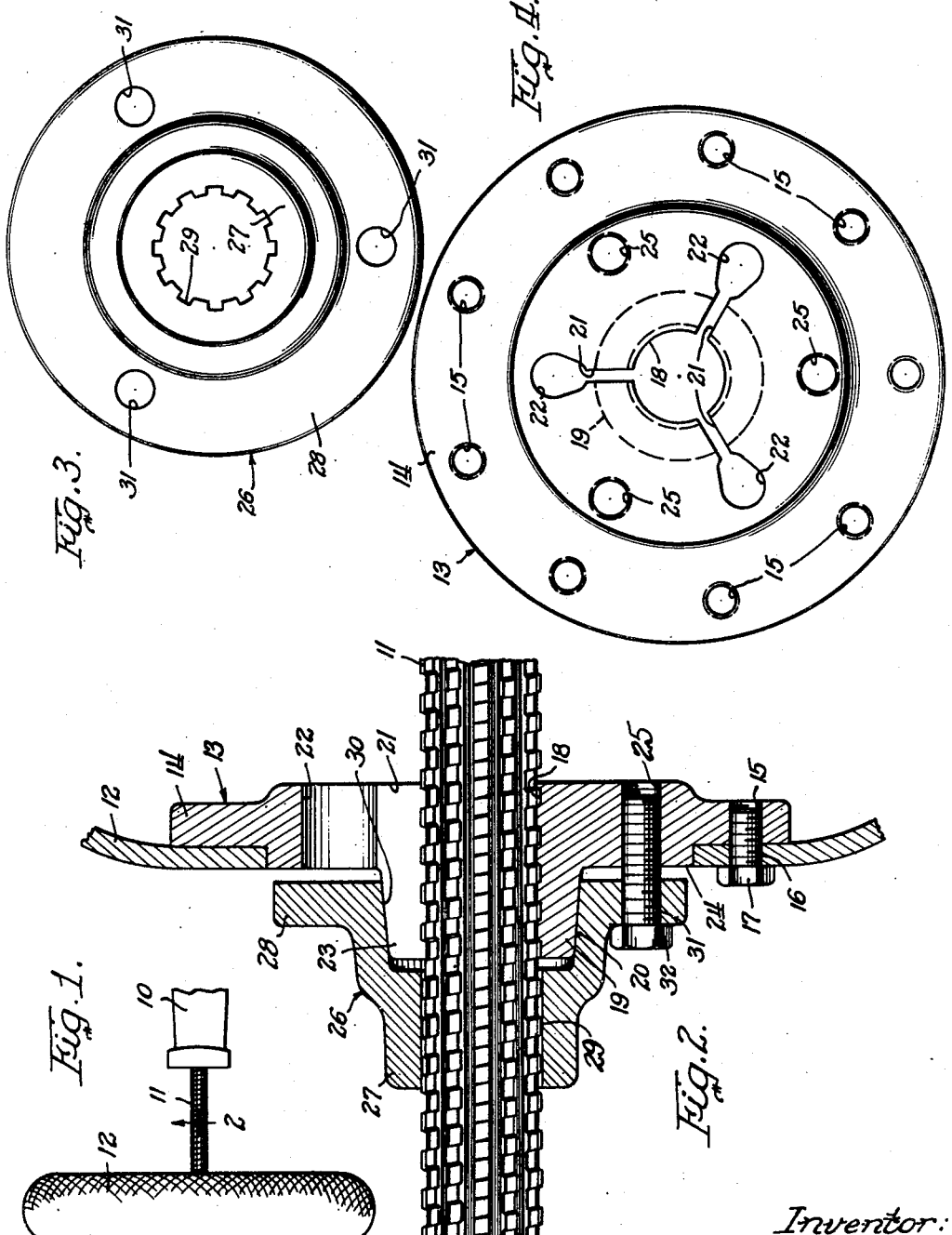
Inventor:
Theophilus Brown.
By
C.T. Parker
Attys.

Patented June 7, 1949

2,472,742

UNITED STATES PATENT OFFICE 2,472,742

ADJUSTABLE AXLE AND WHEEL ASSEMBLY

Theophilus Brown, Moline, Ill., assignor to Deere & Company, Moline, Ill., a corporation of Illinois Application February 27, 1948, Serial No. 11,596

5 Claims. (Cl. 301—128)

This invention pertains to an adjustable axle and wheel assembly and more particularly to such wheel assembly as especially adapted for use in agricultural tractors for the purpose of varying the transverse spacing or tread of the traction wheels.

In the use of an agricultural tractor, it is often desirable to change the tread of the traction wheels when cultivating certain types of crops in accordance with the spacing of the rows in which the crops are planted. The usual method of accomplishing this result in an agricultural tractor involves the use of axles on which the wheels are axially slidable, or the use of wheels having offset hubs providing for reversibility of the wheels. In either of these cases, it is necessary to jack up the tractor and a considerable amount of arduous labor is involved in accomplishing the adjustment.

As an improvement over the foregoing methods, I have disclosed and claimed in my earlier Patents 1,967,283 and 2,099,194 systems whereby the adjustment may be accomplished by tractor power through the use of screw threaded axles cooperable with screw threaded hubs for the wheels, together with locking means for securing the wheels to the axles in any selected position of adjustment.

The present invention pertains to an improvement in the means for mounting the wheel on the axle for accomplishing adjustment thereof in the manner covered broadly by my two earlier patents mentioned above. Basically, the requirement in a construction including an externally screw threaded axle and a wheel adjustable thereon includes an internally threaded hub portion and means, such as a clamp or key, or both, for securing the hub to the axle so that the two may rotate together or for releasing the hub from the axle so that the two may have relative rotation when adjustment is required. My present invention is directed specifically to an improved combined locking and clamping means that meets these requirements. Another object of the invention is to provide such combined clamping and locking means of such construction and design as to adapt the means for ready and efficient use without the complications that have been encountered in earlier devices developed both by myself and others. To this end, I provide a hub portion that is relieved so that it is flexible to provide for radial expansion or contraction thereof, together with a locking member that has a key which fits a spline or keyway in the axle and which further has a clamping portion serving the double function of securing the member to the hub and of drawing the member and hub together to clamp the flexible portion of the hub tightly onto the axle. An important object of the invention is to combine the necessary components of the structure in as few parts as possible.

The foregoing and other desirable objects and important features inherent in and encompassed by my invention will become apparent to those skilled in the art from a reading of the following detailed description of a preferred form of the invention as illustrated in the accompanying sheet of drawings, in which Figure 1 is a fragmentary rear elevational view showing a portion of a tractor including a threaded axle on which a wheel is carried;

Figure 2 is an enlarged cross sectional view of the hub portion of the wheel and the axle substantially as viewed along the line 2—2 of Figure 1;

Figure 3 is a face view of the cap or locking member, as viewed from the left side of Figure 2; and Figure 4 is a face view, on a slightly reduced scale, of the hub portion of the wheel, as viewed from the right side of Figure 2.

Since the invention is applicable to any type of agricultural tractor or other vehicle having a threaded axle, I have shown in Figure 1 only those parts of such tractor or vehicle as are believed necessary for a complete understanding of the invention, the remainder of the tractor construction being familiar to those skilled in the art. With this in mind I have indicated a portion of the tractor rear axle housing at 10 and have shown this housing portion as including a laterally outwardly extending axle 11 on which is carried a wheel 12. It will be understood that the tractor or other vehicle includes similar structure at the opposite side so that there are a pair of axles in axial alignment and a pair of adjustable traction wheels such as 12. As best seen in Figure 2, the axle 11 is externally screw threaded and is further splined axially to provide a plurality of keyways on the axle. Although I have shown a square screw thread, it will be appreciated that any suitable type of thread could be employed. Likewise, a single keyway, or perhaps a plurality of, say, three or four keyways, could be provided in lieu of the splines in the axle. I find that the preferred construction illustrated is ideally suited for the purposes referred to.

The wheel 12 is provided with an improved type of hub, indicated generally by the numeral 13.

This hub is preferably formed as a circular member including a peripheral flange 14 provided with a circle of tapped bores 15 which are aligned with a circle of bores or openings 16 (only one being shown) in the wheel for the purpose of receiving a plurality of cap screws 17. This arrangement provides for securing the hub 13 to the wheel 12 as a rigid but removable part thereof. The hub is centrally apertured at 18 and is internally screw threaded to mate with the external screw threads on the axle 11.

The hub further includes, preferably as an integral portion thereof, an axially directed extension portion 19. The internally threaded opening 18 extends axially through this portion, as shown in Figure 2. The extension portion is provided with an external taper 20, for a purpose to presently appear. In order that the hub may have the necessary flexibility for the purpose of providing for the clamping thereof to the axle 11, I have provided the hub with a relieved portion which I prefer to accomplish by providing a plurality of slits 21 which extend radially outwardly from the central opening 18 into the main body of the hub. These slits are enlarged at their radially outermost ends, as at 22. Further, the relief of the hub in this respect is carried into the extension portion 19, the slits 21 extending axially thereinto, as indicated at 23 in Figure 2. The extension portion is thus separated into a plurality of complementary segmental sections internally recessed by the central opening 18 to provide an embracing structure which, as will hereinafter appear, is expansible and contractible with respect to the axle 11. The hub 13 further includes a flat radial face which extends radially outwardly as a flange 24 at the base of the external taper 20 on the extension portion 19. The flange 24 is provided with a circle of tapped bores 25 (Figure 4).

As means for holding the wheel 12 and hub 13 in any selected position of adjustment, I provide a combined locking and clamping member, indicated generally by the numeral 26. This member is in the form of a cap having a cylindrical portion 27 and an integral flange 28. The cylindrical portion 27 is bored and internally splined at 29 (Figure 3) to mate with the externally splined axle 11. The portion 27 is not threaded. The cap 26 further includes an internally tapered counterbore 30 which, when the cap is installed on the axle adjacent the hub, is complementary to the external taper 20 on the hub extension 19. The flange 28 is provided with a circle of openings 31 corresponding in number to the circle of openings or tapped bores 25 in the hub 13. When the cap is installed, the openings 31 are aligned with the openings 25 and the cap is secured to the hub by a plurality of cap screws 32 which are received by the tapped bores 25.

From the description thus far it will be seen that the hub 13 is internally threaded but is not internally splined; the cap 26 is internally splined but is not internally threaded. Viewed otherwise, the hub and axle may at times have relative rotation and the two may at times move relatively axially in either direction on the axle. The cap 26 can be slid axially in either direction but it cannot rotate relative to the axle. The hub and cap thus provide in a simple manner two of the basic requirements for an adjustable axle assembly of the type referred to. The third requirement is supplied by the clamping and locking action effected by the cap screws 32, the tapers 20 and 30, and the clamping or embracing structure including the portion 19. It will be seen that when the cap screws 32 are passed through the apertures 31 in the flange on the cap 26 and into the tapped bores 25 in the hub 13 and are then tightened, the cap is drawn axially toward the hub, at the same time resulting in an increase of the engagement or wedging action between the tapers 20 and 30, which ultimately results in clamping the embracing structure of the hub tightly onto the axle 11. Inasmuch as the internally threaded opening 18 through the hub extends through the hub body and also through the extension 19, the effective area of the clamp is considerably augmented. Likewise, the extension of the slits 21 radially outwardly into the hub body and axially into the extension 19 provides the necessary flexibility in the hub to give the greatest clamping action on the axle. The cap screws 32, in addition to drawing the cap axially toward the hub 13, serve also as means for securing the cap and hub together for rotation with the axle, this result following from the fact that the cap is splined to the axle and is therefore non-rotatable with respect to the axle.

In the use of a tractor equipped with the adjustable assembly described herein, the cap 26 is first disconnected from the hub 13 by removal of the cap screws 32. The cap is then moved axially outwardly away from the hub, by means of the splined or keyed connection of the cap to the axle. The release of the cap 26 from the hub 13 now frees the latter for rotation relative to the axle. The operator of the tractor need not jack the tractor up but may apply power to the axle 11 and by means of applying a brake to or otherwise holding the wheel at the opposite side of the tractor, and because of the differential action, the axle 11 will be rotated, the direction of rotation depending, of course, upon whether the tractor is operated in a forward or reverse gear according to the direction in which it is desired to accomplish the adjustment. After the desired position of adjustment has been obtained, the cap 26 is moved again axially toward the hub 13 and the cap screws 32 are installed and tightened. The foregoing description has set forth the manner in which the hub will then be clamped or locked to the axle.

At least one prior construction is known in which the hub is not only internally threaded but is also provided with internal keyways to receive a plurality of keys engageable with corresponding keyways in the threaded axle. In a construction of that type, it is almost impossible, under certain circumstances, to free the keys from the axle and hub, inasmuch as considerable dirt and rust may accumulate in the threads and splines and prevent easy removal of the key. According to the present invention, the hub is only internally threaded and is not internally splined; the key is separate from the hub, being carried by the cap 26. Consequently, after the cap screws 32 have been removed and it is found that the cap will not slide freely on the splined axle, power transmitted through the rotating axle may be utilized to drive the hub against the cap to move the latter axially outwardly. This result is not possible in a case where the key operates directly between the hub and the axle. Therefore, the cap member 26, having once been released by tractor power, may be easily moved in either axial direction on the axle. At least, the ability to force the cap member in one direction by power will afford the opportunity to clean out the threads and splines so that the cap may be easily moved in the opposite direction.

Many other features of the invention and many advantages therein over other constructions will be readily apparent to those skilled in the art, as likewise will be many modifications and alterations in the preferred form of the invention illustrated and described here, all of which may be effected without departing from the spirit and scope of the invention as defined in the appended claims.

I claim:

1. In a wheel and axle assembly of the type in which the axle is externally screw threaded and axial adjustment of the wheel on the axle is effected by relative rotation of the two, and wherein the axle has an axial external keyway utilized for locking the wheel in a selected position of axial adjustment, the improvement comprising: a hub for carrying the wheel and including an axial extension portion provided with an external coaxial taper; means including an axially directed opening through the hub and extension portion to receive the axle and provided with an internal screw thread to mate with the axle screw thread; means in the hub including a relieved portion providing for radial flexibility of the hub and extension portion; a radial flange on the hub at the base of the taper on the extension; a locking member including a central portion bored to receive the axle and having a counterbore that is internally tapered to receive the tapered hub extension, and further including a radial flange complementary to the hub flange; means including a key element within the bored portion of the locking member and engaging said member and the axle keyway for holding said member against rotation with respect to the axle; and means for securing the flanges together including a plurality of apertures in the locking member flange, a plurality of tapped bores in the hub flange, and a plurality of cap screws passing through said apertures and threaded into said tapped bores.

2. In a wheel and axle assembly of the type in which the axle is externally screw threaded and axial adjustment of the wheel on the axle is effected by relative rotation of the two, and wherein the axle has an axial external keyway utilized for locking the wheel in a selected position of axial adjustment, the improvement comprising: a hub for carrying the wheel and including an axial extension portion thereon; means including an axially directed opening through the hub and extension portion to receive the axle; means providing an internal screw thread for the hub within at least a portion of said opening to mate with the axle screw thread; means in the hub including a relieved portion providing for radial flexibility of at least said extension portion so that said extension portion may be contracted radially with respect to the fit between the axle and the axial opening in the hub; and means for locking the wheel and axle together against relative rotation, including clamping means for contracting the extension portion tightly onto the axle, and further including a key element engaging the extension portion and received by the axle keyway.

3. In a wheel and axle assembly of the type in which the axle is externally screw threaded and axial adjustment of the wheel on the axle is effected by relative rotation of the two, and wherein the axle has an axial external keyway utilized for locking the wheel in a selected position of axial adjustment, the improvement comprising: a hub for carrying the wheel and including an internally screw threaded, axially directed opening to receive the externally screw threaded axle; means on the hub including a plurality of generally axially extending complementary segmented elements internally recessed generally in axial alinement with said opening to provide a contractible and expandible structure embracing the axle; and means for locking the wheel and axle together against relative rotation, including clamping means for contracting the embracing structure tightly onto the axle, and further including a key element engaging the embracing structure and received by the axle keyway.

4. In a wheel and axle assembly of the type in which the axle is externally screw threaded and splined and axial adjustment of the wheel on the axle is effected by relative rotation of the two, the improvement comprising: a hub for carrying the wheel and including an axial extension portion provided with an external coaxial taper; means including an axially directed opening through the hub and extension portion to receive the axle and provided with an internal screw thread to mate with the axle screw thread; means in the hub including a relieved portion providing for radial flexibility of at least a part of the hub; a locking member including a central portion bored and internally splined to receive the axle and having a counterbore that is internally tapered to receive the tapered hub extension; and means for securing the locking member and hub together for rotation with the axle including means for drawing the locking member axially toward the hub in a direction effecting increase of the engagement between the internal and external tapers for clamping the hub onto the axle.

5. The invention defined in claim 4, further characterized in that: the means providing the relieved portion in the hub includes a plurality of slits extending radially outwardly from the internally screw threaded opening and further extending axially into the extension portion.

THEOPHILUS BROWN.

No references cited.